United States Patent [19]

Iida

[11] Patent Number: 5,205,931

[45] Date of Patent: Apr. 27, 1993

[54] CERAMIC AND CALCIUM FILTER MECHANISM

[76] Inventor: Yukio Iida, 1-1-2 Yamanouchi, Kanagawa-Ku, Yokohama-Shi, Kanagawa-Ken, Japan

[21] Appl. No.: 737,063

[22] Filed: Jul. 29, 1991

[51] Int. Cl.$^5$ .............................. B01D 27/02
[52] U.S. Cl. ..................... 210/264; 210/290; 210/416.3; 210/510.1
[58] Field of Search .............. 210/263, 264, 282, 287, 210/290, 416.3, 510.1

[56] References Cited

U.S. PATENT DOCUMENTS

| | | | |
|---|---|---|---|
| 1,997,830 | 4/1935 | Michaud | 210/290 |
| 4,659,463 | 4/1987 | Chandler et al. | 210/290 |
| 4,826,594 | 5/1989 | Sedman | 210/287 |
| 5,007,994 | 4/1991 | Snee | 210/290 |
| 5,064,534 | 11/1991 | Busch et al. | 210/510.1 |
| 5,102,542 | 4/1992 | Laurence et al. | 210/510.1 |

Primary Examiner—Robert A. Dawson
Assistant Examiner—W. L. Millard
Attorney, Agent, or Firm—G. Donald Weber, Jr.

[57] ABSTRACT

A filter mechanism which includes conventional filtration techniques such as calcium and/or carbon filtration components. In addition, the mechanism includes a portion thereof comprising a substantial number of ceramic spheres which include a $Fe_xCl_y$ component. The $Fe_xCl_y$ component is formed as part of the ceramic sphere wherein a small portion of the $Fe_xCl_y$ component is adsorbed or absorbed by the water as it passes through the filter mechanism. The water produced by this filter mechanism therefore approximates many standard body fluids wherein the water enhances bodily funtions when ingested into the system.

11 Claims, 1 Drawing Sheet

CERAMIC AND CALCIUM FILTER MECHANISM

BACKGROUND

1. Field of the Invention

This invention relates to a device for use as a water treatment apparatus.

2. Prior Art

The increasing public awareness relating to the degradation of domestic water quality has generated increasing interest in the location of water conditioning units at the point of use rather than at a central treatment facility. At present, municipalities treat drinking water supplies to kill water-borne bacteria with varying degrees of effectiveness. However, most municipalities do not attempt to treat water supplies for toxic chemicals and removal thereof is left up to the user. In addition, substantial amounts of sediment appear in domestic water supplies. This sediment is in addition to the mineral ions, notably calcium and magnesium, which are characteristic of hard water. It is recognized that removal of the mineral ions causing hard water is the responsibility of the water user rather than the water supplier.

Several different types of water conditioning devices have been utilized to remove one or more of the different contaminents at the point of use. The conventional types of water softener which utilize a rechargeable cation resin to effect an ion exchange between calcium and magnesium ions and sodium ions to produce a soluble sodium salt before the water enters the facility is commonplace. The water softener utilizes a single resin which is capable of being recharged by reversing the ion exchange process and flushing the system while diverting the output of the water softener to a discharge drain. A similar unit is often used to effect dealkalizing operations utilizing a separate chamber containing an anion resin which will remove bicarbonate ions.

An ion exchange process which removes those polarized ionic contaminants is often supplemented with an additional container containing an activated carbon, typically silver-activated charcoal, which adsorbs certain material. Among these adsorbed materials are non-polar organics including various hydrocarbons. The activation of the carbon, typically with silver, has been shown to remove harmful bacteria. Thus, the user desiring to effect broad spectrum water treatment at his facility is faced today with connecting a plurality of treatment devices in series between the municipal water supply and the water output taps. The homeowner with a relatively low volume water usage has used a double chamber series-connected portable water conditioner wherein a cation and an anion resin are located in a single container. A serially-connected activated charcoal container, frequently expressly made to be disposable, is also provided. Among these relatively low volume portable water conditioners are the apparatus described in U.S. Pat. Nos. 4,287,057 and 4,541,926.

The typical home water conditioner is characterized by a container having a number of compartments therein, each containing a different purifying media separated by screens which may be themselves silver activated to reduce or eliminate harmful bacteria. The home water conditioner of U.S. Pat. No. 4,541,926 shows two identical containers, differing only in size, one of which contains a mixture of a cation and an anion resin. The device has been found to produce the desired results for low-volume home water usage.

SUMMARY OF THE INSTANT INVENTION

A filter mechanism which comprises any suitable and conventional housing for storing the filtration component. Typically, the housing should be inert and non-reactive with the water and/or materials included in the filter.

A layer of calcium is included to provide a first filtration level for removing any sand, grit or other particulate from the water. The calcium layer can, in fact, comprise several layers of differing fineness.

In one embodiment, an active carbon layer such as charcoal or the like can also be provided subsequent to the calcium layer.

The most significant layer in this mechanism comprises a plurality of ceramic spheres fabricated of any suitable ceramic such as a clay material or the like, in which has been mixed a $Fe_xCl_y$ component wherein x and y can take any appropriate numerical value. In addition x and y can be of the same value, in some cases. When water passes through the apparatus, it is filtered in conventional manner by the calcium and carbon layers. The ceramic sphere layer also removes additional particulates and the like. Moreover, when the water passes through the layer of the spheres, it will adsorb or absorb some of the $Fe_xCl_y$ component, typically on the order of $2 \times 10^{-12}$ by weight of the effluent from the filter mechanism. The effluent then assumes a characteristic which is somewhat similar to many body fluids. Moreover, it has been found that bacteria does not breed in this water. Consequently, the water does not become stale or contaminated.

DESCRIPTION OF THE PREFERRED EMBODIMENT

Figure 1:
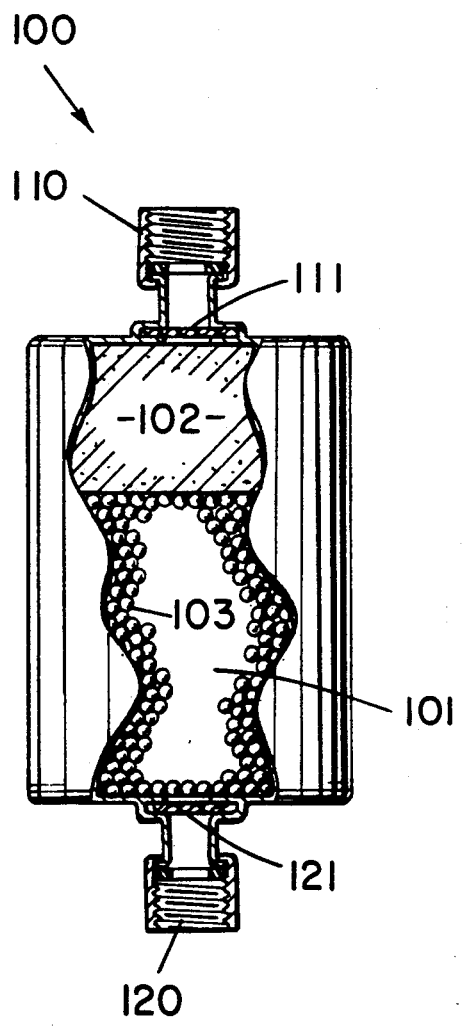
FIG. 1 is a schematic representation of one embodiment of the filter mechanism of the instant invention.

Referring now to FIG. 1, there is shown a schematic representation of one embodiment of the instant invention. In this embodiment, the filter apparatus 100 is connected between a water inlet 110 and a water outlet 120. The inlet 110 is joined to the filter apparatus by suitable fittings and plumbing 111 Likewise, the outlet 120 is connected to the filter mechanism 100 by suitable fittings and plumbing 121.

In the embodiment shown in FIG. 1, the filter mechanism includes a layer 102 which is formed of calcium-type materials. For example, layer 102 can be formed by sea shells, coral or the like. Typically, the materials of the calcium layer are ground quite fine. In some embodiments, small pebbles or the like can be included.

The next layer 101 includes a plurality of spheres 103. The spheres 103 are formed, in any suitable fashion, of ceramic material which can be baked or cured as desired. Typically, the ceramic spheres are glazed so as to provide a totally impervious surface.

In formation of the ceramic spheres, the $Fe_xCl_y$ component is incorporated into the clay or similar ceramic material. As noted above, the values of x and y can be of any suitable configuration or range. Moreover, the values of x and y can be the same in some instances. In another manner of description, the active component can be defined by the general formulation $Fe++_{m^-}$ $Fe+++_nCl_{2m+2n}$. In the preferred embodiment, the active component is $Fe_2Cl_5$. Of course, any combination of a ferrous material and a chlorine material can be utilized.

The ceramic spheres are arranged to remove additional particulate impurities from the water as it passes therethrough. In addition, the water adsorbs and/or absorbs some of the $Fe_xCl_y$ material from the spheres. Thus, the water effluent from the outlet 120 includes some of the $Fe_xCl_y$ component therein. As noted above, this combination of water and additives tends to resemble many body fluids whereby the water thus produced tends to increase the health and welfare of the user.

In many cases, the apparatus shown and described relative to FIG. 1 is used in animal feeding techniques. It has been found that many animals or fowl tend to be healthier and better producers of their respective products after being provided with the water from this apparatus.

Figure 2:
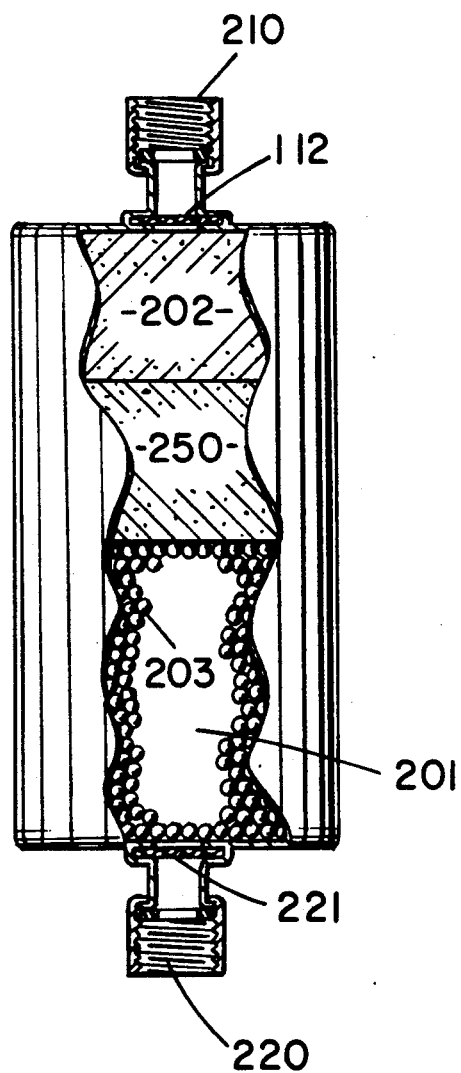
FIG. 2 is a schematic representation of another embodiment of the filter mechanism of the instant invention.

Referring now to FIG. 2, there is shown a schematic representation of another embodiment of the instant invention. In this embodiment, the filter apparatus 200 is connected between a water inlet 210 and a water outlet 220. The inlet 210 is joined to the filter apparatus by suitable fittings and plumbing 211. Likewise, the outlet 220 is connected to the filter mechanism 200 by suitable fittings and plumbing 221.

In the embodiment shown in FIG. 2, the filter mechanism includes a layer 202 which is formed of calcium-type materials. For example, layer 202 can be formed by sea shells, coral or the like in the same fashion as layer 102 in the embodiment of FIG. 1.

The embodiment of FIG. 2 includes a layer 250 of carbon, typically in the form of activated charcoal, or the like. The carbon layer 250 removes additional impurities from the water in a conventional manner.

The layer 201 includes a plurality of spheres 203 similar to the spheres 103 in the embodiment of FIG. 1. The spheres 203 are formed in any suitable fashion of ceramic material which can be baked or cured as desired. Typically, the ceramic spheres are glazed so as to provide a totally impervious surface.

In formation of the ceramic spheres, the $Fe_xCl_y$ component is incorporated into the clay or similar ceramic material in the same manner as in the embodiment described relative to FIG. 1. As noted above, the values of x and y can be of any suitable configuration or range.

The ceramic spheres are arranged to remove additional particulate impurities from water as it passes therethrough. In addition, the water adsorbs and/or absorbs some of the $Fe_xCl_y$ material from the spheres. Thus, the water effluent from the outlet 220 includes some of the $Fe_xCl_y$ component therein. As noted above, this combination tends to resemble many body fluids whereby the water thus produced is intended to increase the health and welfare of the user.

In many cases, the apparatus shown and described relative to FIG. 2 is used in human consumption. It has been found that many users tend to be healthier after being provided with the water from this apparatus.

Thus, there is shown and described a unique design and concept of a filter mechanism. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. A filter apparatus comprising,
   a housing having inlet and outlet means,
   a first layer comprising pieces of material including calcium therein disposed within said housing, and
   a second layer comprising pieces of ceramic material disposed within said housing,
   said ceramic material contains the elements Fe and Cl,
   whereby fluid is passed through said housing and through said first and second layers.

2. The filter apparatus recited in claim 1 including,
   a third layer comprising pieces of carbonaceous material disposed within said housing.

3. The filter apparatus recited in claim 2 wherein,
   said third layer is disposed between said first and second layers.

4. The filter apparatus recited in claim 1 wherein,
   the elements are combined in the combination $Fe++_mFe+++_nCl_{2m+3n}$.

5. The filter apparatus as recited in claim 1 wherein,
   the elements are combined in the form of $Fe_2Cl_5$.

6. The filter apparatus recited in claim 1 wherein,
   said housing is formed of a material which is substantially inert in the presence of said fluid.

7. The filter apparatus recited in claim 1 wherein,
   said ceramic material is formed as a plurality of spheres.

8. The filter apparatus recited in claim 1 wherein,
   said ceramic material is glazed.

9. The filter apparatus recited in claim 1 wherein,
   said fluid adsorbs a small amount of said elements so as to slightly alter the composition of said fluid.

10. The filter apparatus recited in claim 1 wherein,
    said fluid comprises water.

11. The filter apparatus recited in claim 2 wherein,
    said carbonaceous material is comprised of charcoal.

* * * * *